US012334604B2

(12) United States Patent
Kim et al.

(10) Patent No.: US 12,334,604 B2
(45) Date of Patent: Jun. 17, 2025

(54) MEMBRANE HUMIDIFIER FOR FUEL CELL

(71) Applicant: KOLON INDUSTRIES, INC., Seoul (KR)

(72) Inventors: Do Woo Kim, Seoul (KR); Kyoung Ju Kim, Seoul (KR); Jin Hyung Lee, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 488 days.

(21) Appl. No.: 17/055,175

(22) PCT Filed: Jun. 4, 2019

(86) PCT No.: PCT/KR2019/006684
§ 371 (c)(1),
(2) Date: Nov. 13, 2020

(87) PCT Pub. No.: WO2019/235800
PCT Pub. Date: Dec. 12, 2019

(65) Prior Publication Data
US 2021/0151780 A1 May 20, 2021

(30) Foreign Application Priority Data

Jun. 4, 2018 (KR) ........................ 10-2018-0064025

(51) Int. Cl.
*H01M 8/04119* (2016.01)
*B01D 63/02* (2006.01)
(52) U.S. Cl.
CPC .... *H01M 8/04149* (2013.01); *B01D 63/0223* (2022.08); *B01D 63/033* (2022.08); *B01D 2313/2011* (2022.08)

(58) Field of Classification Search
CPC . H01M 8/04149; B01D 63/022; B01D 53/22; B01D 63/04
See application file for complete search history.

(56) References Cited

U.S. PATENT DOCUMENTS 5,470,469 A * 11/1995 Eckman ............... B01D 63/043
210/336
10,668,432 B2 * 6/2020 Oh .......................... B01D 63/04
(Continued)

FOREIGN PATENT DOCUMENTS

CN 102834958 A 12/2012
CN 103069222 A 4/2013
(Continued)

OTHER PUBLICATIONS

EP search report dated Feb. 11, 2022.
International Search Report issued on Sep. 16, 2019.

*Primary Examiner* — Milton I Cano
*Assistant Examiner* — Albert Michael Hilton
(74) *Attorney, Agent, or Firm* — Harvest IP Law, LLP

(57) ABSTRACT

The present invention relates to a membrane humidifier for a fuel cell, which can prevent a decrease in humidification efficiency due to a pressure difference between the inside and outside of a membrane humidifier, the membrane humidifier for a fuel cell, according to an embodiment of the present invention, comprising: a middle case having a module insertion part inside; a cap case coupled to the middle case; a hollow fiber membrane module inserted to the module insertion part; and a pressure buffer part between the inner wall of the middle case and the module insertion part.

1 Claim, 11 Drawing Sheets

(56) References Cited

U.S. PATENT DOCUMENTS

| | | | |
|---|---|---|---|
| 2001/0009306 A1* | 7/2001 | Shimanuki | H01M 8/04119 |
| | | | 261/107 |
| 2005/0116365 A1 | 6/2005 | Yazawa | |
| 2009/0130496 A1 | 5/2009 | Ono | |
| 2012/0270120 A1* | 10/2012 | Kim | H01M 8/04156 |
| | | | 429/413 |
| 2016/0322654 A1 | 11/2016 | Koo et al. | |
| 2017/0358808 A1 | 12/2017 | Kim | |

FOREIGN PATENT DOCUMENTS

| | | | |
|---|---|---|---|
| CN | 106099142 A | 11/2016 | |
| CN | 205752394 U | 11/2016 | |
| EP | 3312923 A1 | 4/2018 | |
| JP | H0721185 U | 4/1995 | |
| JP | 2003065566 A | 3/2003 | |
| JP | 2005156062 A | 6/2005 | |
| JP | 2007046801 A | 2/2007 | |
| JP | 2008041537 A | 2/2008 | |
| JP | 2009016230 A | 1/2009 | |
| JP | 2010107099 A | 5/2010 | |
| JP | 2011141082 A | 7/2011 | |
| JP | 2016-035895 A1 | 3/2016 | |
| JP | 6032785 B2 | 11/2016 | |
| JP | 2018508340 A | 3/2018 | |
| KR | 10-2001-0001022 A | 1/2001 | |
| KR | 10-2001-0006122 A | 1/2001 | |
| KR | 10-2001-0006128 A | 1/2001 | |
| KR | 10-2001-0021217 A | 3/2001 | |
| KR | 10-2001-0026696 A | 4/2001 | |
| KR | 10-2001-0063366 A | 7/2001 | |
| KR | 10-2009-0013304 A | 2/2009 | |
| KR | 10-2009-0057773 A | 6/2009 | |
| KR | 10-2009-0128005 A | 12/2009 | |
| KR | 10-1364354 B1 | 2/2014 | |
| KR | 20140117346 A | 10/2014 | |
| KR | 20160015541 A | 2/2016 | |
| KR | 10-2018-0037390 A | 4/2018 | |
| WO | WO-2016208878 A1 * | 12/2016 | B01D 63/02 |

* cited by examiner

MEMBRANE HUMIDIFIER FOR FUEL CELL

CROSS REFERENCE TO RELATED APPLICATIONS

This application is a National Stage of International Application No. PCT/KR2019/006684 filed Jun. 4, 2019, claiming priority based on Korean Patent Application No. 10-2018-0064025 filed Jun. 4, 2018.

TECHNICAL FIELD

The present disclosure relates to a fuel cell membrane humidifier, and more particularly to a fuel cell membrane humidifier capable of preventing a decrease in humidification efficiency due to a pressure difference between the inside and outside of the membrane humidifier.

BACKGROUND ART

A fuel cell is a power generation cell that combines hydrogen and oxygen to generate electricity. Such a fuel cell has advantages in that it is possible to continuously generate electricity as long as hydrogen and oxygen are supplied, unlike a general chemical cell, such as a dry cell or a storage cell, and in that there is no heat loss, whereby efficiency of the fuel cell is about twice as high as efficiency of an internal combustion engine.

In addition, the fuel cell directly converts chemical energy generated by combination of hydrogen and oxygen into electrical energy, whereby the volume of contaminants that are discharged is small. Consequently, the fuel cell has advantages in that the fuel cell is environmentally friendly and in that a concern about depletion of resources due to an increase in energy consumption can be reduced.

Based on the kind of an electrolyte that is used, such a fuel cell may be generally classified as a polymer electrolyte membrane fuel cell (PEMFC), a phosphoric acid fuel cell (PAFC), a molten carbonate fuel cell (MCFC), a solid oxide fuel cell (SOFC), or an alkaline fuel cell (AFC).

These fuel cells are operated fundamentally by the same principle, but are different from each other in terms of the kind of fuel that is used, operating temperature, catalyst, and electrolyte. Among these fuel cells, the polymer electrolyte membrane fuel cell is known as being the most favorable to a transportation system as well as small-scale stationary power generation equipment, since the polymer electrolyte membrane fuel cell is operated at a lower temperature than the other fuel cells and the output density of the polymer electrolyte membrane fuel cell is high, whereby it is possible to miniaturize the polymer electrolyte membrane fuel cell.

One of the most important factors to improve the performance of the polymer electrolyte membrane fuel cell is to supply a predetermined amount or more of moisture to a polymer electrolyte membrane (PEM) (also referred to as a proton exchange membrane) of a membrane electrode assembly (MEA) in order to maintain water content. The reason for this is that, in the case in which the polymer electrolyte membrane becomes dry, power generation efficiency is abruptly reduced.

1) A bubbler humidification method of filling a pressure-resistant container with water and allowing a target gas to pass through a diffuser in order to supply moisture, 2) a direct injection method of calculating the amount of moisture that is necessary for fuel cell reaction and directly supplying moisture to a gas stream pipe through a solenoid valve, and 3) a membrane humidification method of supplying moisture to a gas fluid bed using a polymer separation membrane are used as methods of humidifying the polymer electrolyte membrane.

Among these methods, the membrane humidification method, which provides water vapor to a gas that is supplied to the polymer electrolyte membrane using a membrane configured to selectively transmit only water vapor included in an exhaust gas in order to humidify the polymer electrolyte membrane, is advantageous in that it is possible to reduce the weight and size of a humidifier.

In the case in which a module is formed, a hollow fiber membrane having large transmission area per unit volume is preferably used as the selective transmission membrane used in the membrane humidification method. That is, in the case in which a membrane humidifier is manufactured using a hollow fiber membrane, high integration of the hollow fiber membranes having large contact surface area is possible, whereby it is possible to sufficiently humidify a fuel cell even in the case of a small capacity, it is possible to use a low-priced material, and it is possible to collect moisture and heat included in an off gas discharged from the fuel cell at a high temperature and to reuse the collected moisture and heat through the humidifier.

Meanwhile, humidification efficiency is reduced due to a pressure difference between the inside and outside of the membrane humidifier during operation of the membrane humidifier, which will be described with reference to FIGS. 1 to 4.

FIGS. 1 to 4 are sectional views of a conventional fuel cell membrane humidifier. For convenience of description, only hollow fiber membranes at potting units P are shown in the figures, and hollow fiber membranes at the other elements are omitted from the figures. In the conventional membrane humidifier, a hollow fiber membrane module 11 having a plurality of hollow fiber membranes therein is housed in a middle case 10. As shown, the hollow fiber membrane module 11 may be configured in the form of a cartridge. A module insertion unit 12, into which the cartridge type hollow fiber membrane module 11 is inserted, is formed in the middle case 10. The module insertion unit 12 includes a plurality of partition walls 12a and 12b. Here, the partition wall 12b constituting the outer wall of the module insertion unit 12 is substantially a portion of the middle case 10.

As shown in FIG. 2, the hollow fiber membrane module 11 is inserted into the module insertion unit 12 such that opposite side surfaces of the hollow fiber membrane module 11 are fitted between neighboring partition walls 12a and 12b. At this time, the middle case 10 has a central dent part, and the inner wall of the central dent part and the hollow fiber membrane module 11 are brought into tight contact with each other. As a result, two fluid flow spaces A and B between non-dent parts of the middle case 10 located at opposite sides of the central dent part and the hollow fiber membrane module 11 are isolated from each other.

Meanwhile, a second fluid (i.e. off gas) discharged from a fuel cell stack (not shown) is introduced through a fluid inlet (not shown) formed in the middle case 10 and flows through the hollow fiber membrane module 11. At this time, the second fluid exchanges moisture with a first fluid (i.e. air) supplied from a blower and flowing into the hollow fiber membranes. The reference numeral 20 indicates a cap case coupled to the middle case 10, wherein a fluid introduction/discharge port 20a, through which the first fluid is introduced/discharged, is formed in the cap case 20.

However, a high-pressure operation condition, i.e. in the case in which the second fluid, introduced into the middle case 10 through the fluid inlet (not shown) is a fluid having pressure P1 higher than atmospheric pressure P2 outside the membrane humidifier, a pressure difference is generated between the inside and outside of the membrane humidifier, and the pressure P1 of the second fluid flowing in the membrane humidifier is higher than the atmospheric pressure P2 outside the membrane humidifier. As a result, a pressure gradient is formed in an outward direction of the membrane humidifier, whereby a portion of the membrane humidifier (particularly, the central dent part of the middle case 10) is deformed in the outward direction of the membrane humidifier, as shown in FIG. 3. Meanwhile, pressures P1 at opposite sides of each of the partition walls 12a disposed in the middle case 10 are the same, whereby no pressure gradient is formed, and therefore the partition walls are not deformed.

In the case in which the middle case 10 is deformed as the result of formation of the pressure gradient, a gap G is formed between the hollow fiber membrane module 11 and the inner wall of the middle case 10, as shown in FIG. 4. The second fluid in the fluid flow space A directly flows to the fluid flow space B through the gap G not via the hollow fiber membrane module 11. The second fluid that has not passed through the hollow fiber membrane module 11 does not contribute to humidification through the hollow fiber membranes, whereby humidification efficiency is reduced.

Meanwhile, FIGS. 1 to 4 exemplarily show that the second fluid (i.e. the off gas) is introduced through the fluid inlet (not shown) of the middle case 10. However, the present disclosure is not limited thereto. The first fluid (i.e. the air) may be introduced through the fluid inlet (not shown) of the middle case 10, and the second fluid discharged from the fuel cell stack (not shown) may be introduced through the fluid inlet 20a of the cap case 20.

DISCLOSURE

Technical Problem

It is an object of the present disclosure to provide a fuel cell membrane humidifier capable of preventing a decrease in humidification efficiency due to a pressure difference between the inside and outside of the membrane humidifier.

Technical Solution

A fuel cell membrane humidifier according to an embodiment of the present disclosure includes a middle case having a module insertion unit therein, a cap case coupled to the middle case, a hollow fiber membrane module inserted into the module insertion unit, and a pressure buffer unit disposed between the inner wall of the middle case and the module insertion unit.

In the fuel cell membrane humidifier according to the embodiment of the present disclosure, the module insertion unit may include an outermost partition wall spaced apart from the inner wall of the middle case, and the pressure buffer unit may be constituted by a space between the outermost partition wall and the inner wall of the middle case.

In the fuel cell membrane humidifier according to the embodiment of the present disclosure, the module insertion unit may include a plurality of partition walls, the plurality of partition walls may include an outermost partition wall disposed nearest to the inner wall of the middle case and an inner partition wall disposed more centrally compared to the outermost partition wall, and the pressure buffer unit may be constituted by a space between the outermost partition wall and the inner wall of the middle case.

The fuel cell membrane humidifier according to the embodiment of the present disclosure may further include a connection portion disposed between the outermost partition wall and the inner wall of the middle case, the connection portion being configured to divide the space into first and second spaces, the first and second spaces being isolated from each other.

In the fuel cell membrane humidifier according to the embodiment of the present disclosure, the hollow fiber membrane module may include at least one hollow fiber membrane bundle constituted by a plurality of integrated hollow fiber membranes or at least one hollow fiber membrane cartridge having a plurality of hollow fiber membranes housed therein.

A fuel cell membrane humidifier according to another embodiment of the present disclosure includes a middle case and a cap case coupled to the middle case, wherein the middle case includes a middle case body having a hollow fiber membrane module inserted therein and a middle case cover detachably coupled to the middle case body, and a space between the middle case body and the middle case cover constitutes a pressure buffer unit.

In the fuel cell membrane humidifier according to the embodiment of the present disclosure, the middle case body may be provided in at least one side surface thereof with at least one fluid window.

In the fuel cell membrane humidifier according to the embodiment of the present disclosure, the middle case cover may include a fluid inlet configured to allow a fluid to be introduced therethrough or a fluid outlet configured to allow a fluid to be discharged therethrough.

In the fuel cell membrane humidifier according to the embodiment of the present disclosure, the hollow fiber membrane module may include at least one hollow fiber membrane bundle constituted by a plurality of integrated hollow fiber membranes or at least one hollow fiber membrane cartridge having a plurality of hollow fiber membranes housed therein.

In the fuel cell membrane humidifier according to the embodiment of the present disclosure, the hollow fiber membrane module may include a plurality of hollow fiber membrane cartridges, and a plurality of partition walls may be formed in the middle case body.

The details of other embodiments according to various aspects of the present disclosure are included in the following detailed description of the present disclosure.

Advantageous Effects

According to embodiments of the present disclosure, it is possible to prevent a decrease in humidification efficiency due to a pressure difference between the inside and outside of a membrane humidifier.

BEST MODE

The present disclosure may be changed in various manners and may have various embodiments, wherein specific embodiments will be illustrated and described in detail in the following detailed description. However, the present disclosure is not limited to the specific embodiments, and it should be understood that the present disclosure includes all modifications, equivalents, or substitutions included in the idea and technical scope of the present disclosure.

The terms used in the present disclosure are provided only to describe the specific embodiments, and do not limit the present disclosure. Singular forms are intended to include plural forms as well, unless the context clearly indicates otherwise. In the present disclosure, it should be understood that the terms "includes," "has," etc. specify the presence of features, numbers, steps, operations, elements, components, or combinations thereof described in the specification, but do not preclude the presence or addition of one or more other features, numbers, steps, operations, elements, components, or combinations thereof. Hereinafter, fuel cell membrane humidifiers according to embodiments of the present disclosure will be described with reference to the accompanying drawings.

FIGS. 5 to 8 are views showing various forms of a fuel cell membrane humidifier according to an embodiment of the present disclosure. As shown in FIGS. 5 to 8, the fuel cell membrane humidifier according to the embodiment of the present disclosure (hereinafter referred to as a "membrane humidifier") includes a middle case 110 and cap cases 120.

Figure 5:
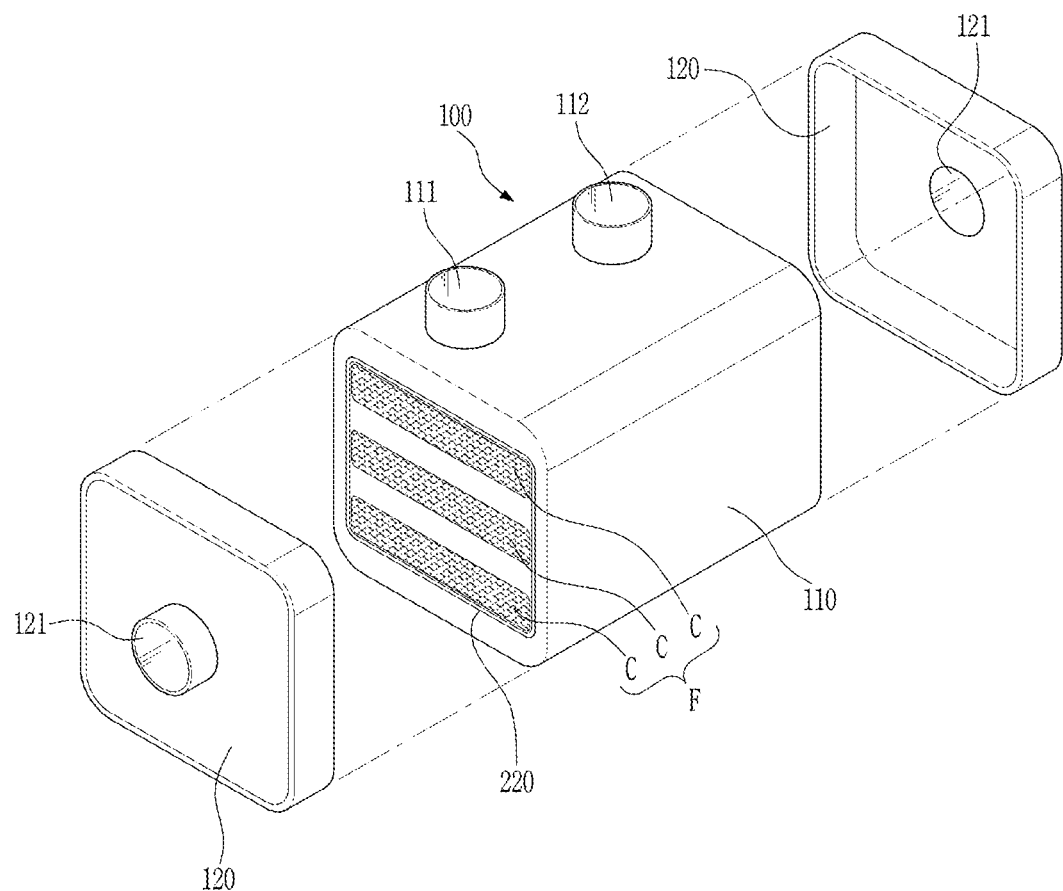
FIGS. 5 to 8 are views showing various forms of a fuel cell membrane humidifier according to an embodiment of the present disclosure.
Figure 6:
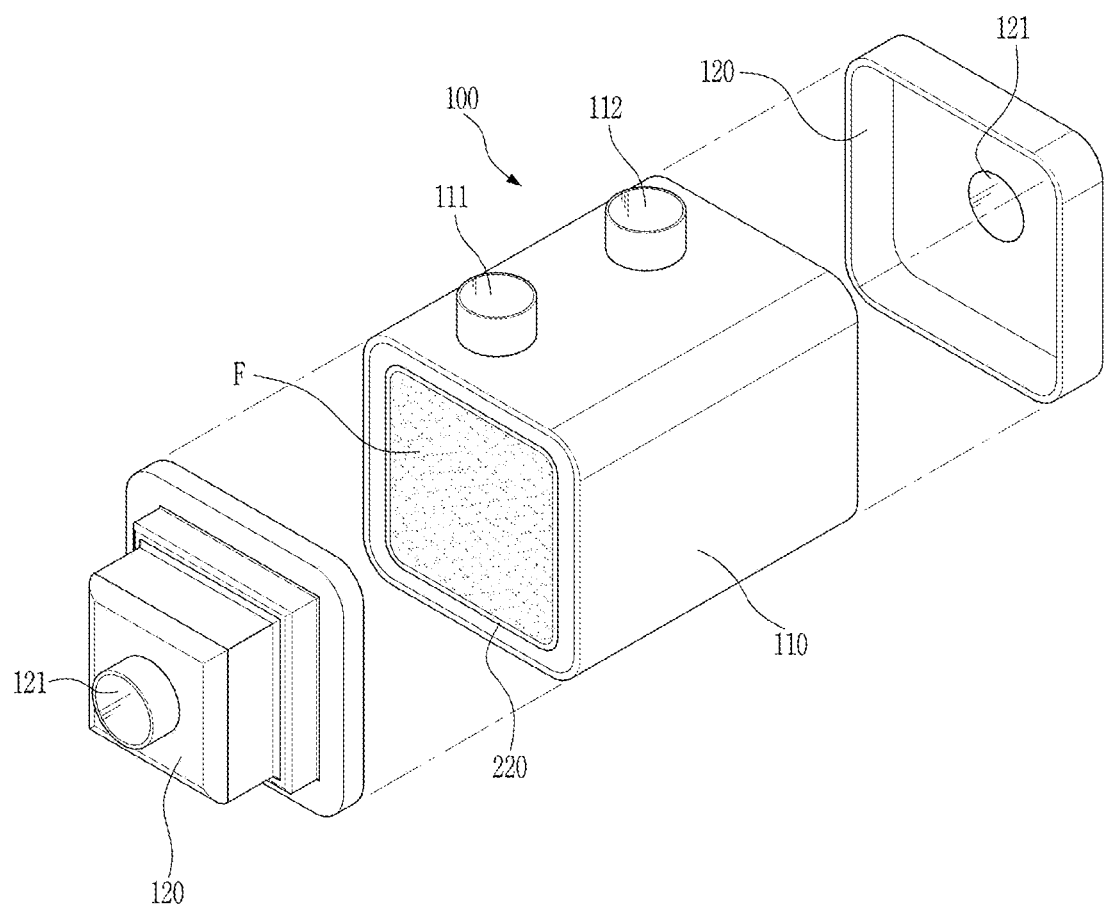
Figure 7:
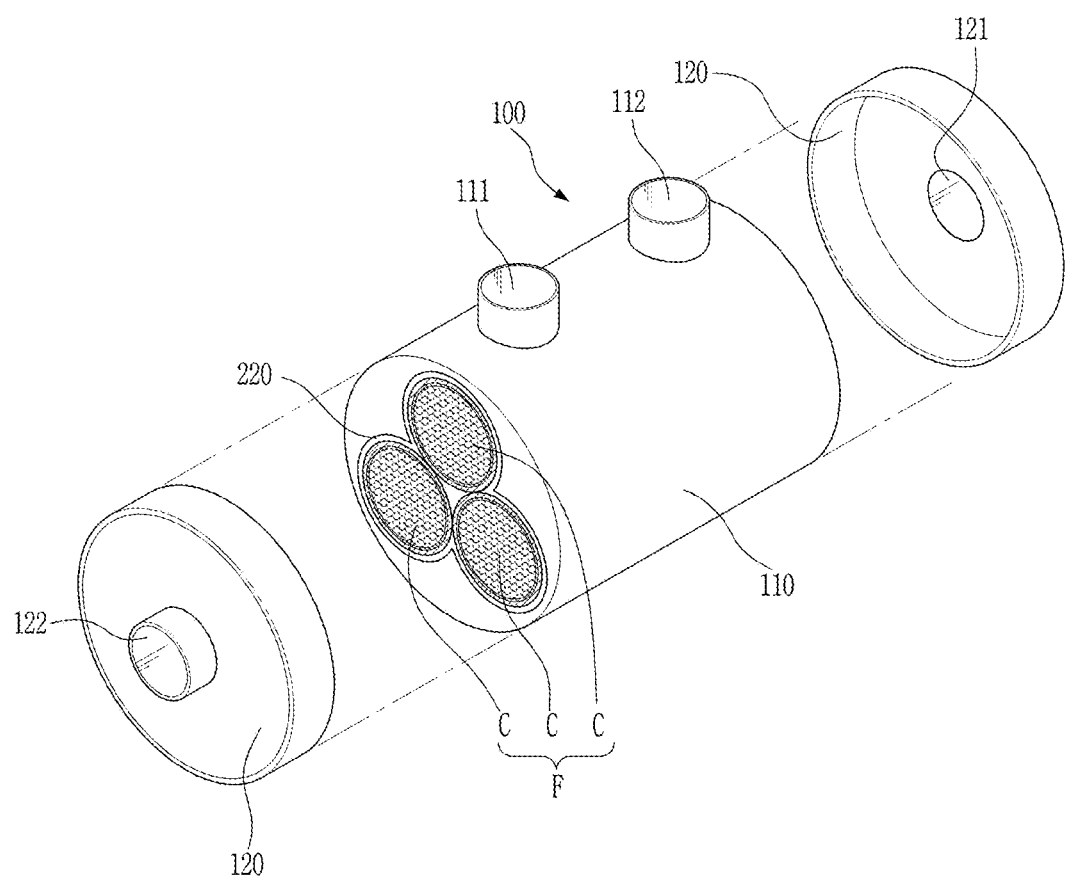
Figure 8:
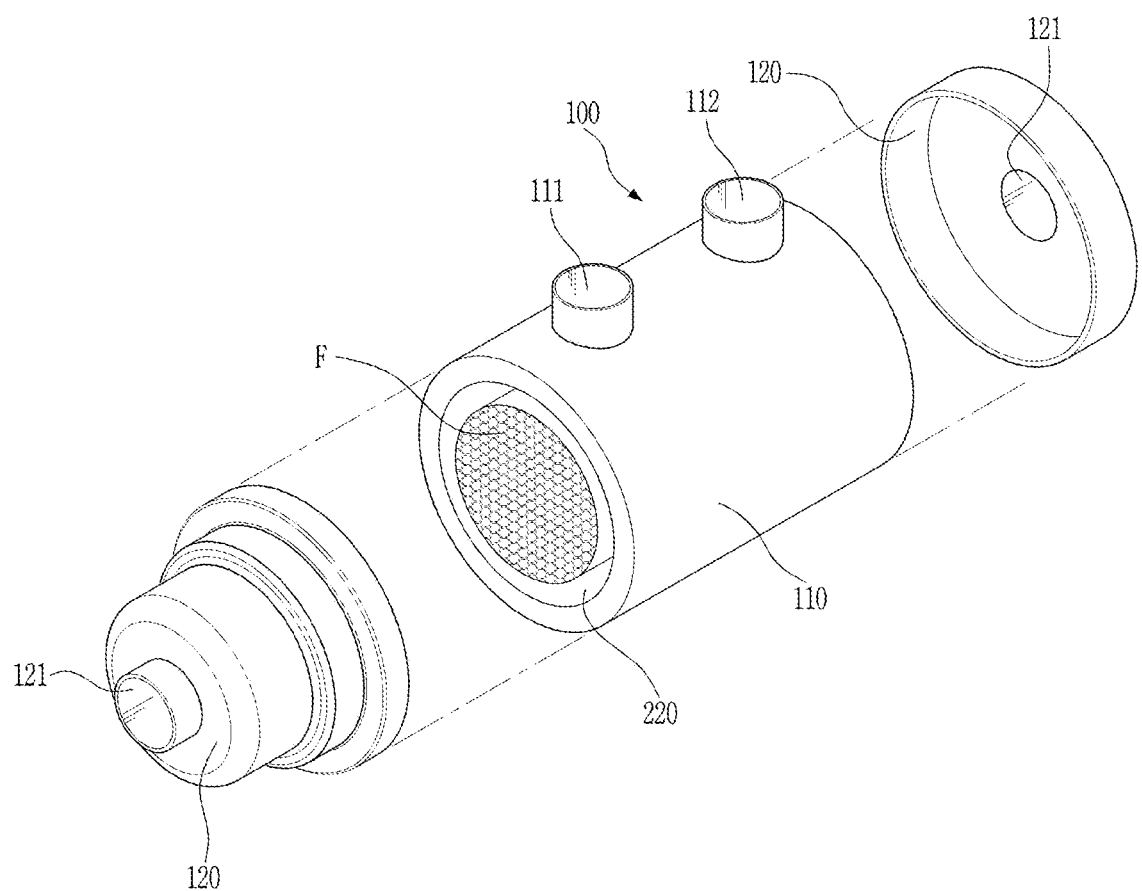

The middle case 110 is coupled to the cap cases 120 to define the external appearance of the membrane humidifier. Each of the middle case 110 and the cap cases 120 may be made of hard plastic, such as polycarbonate, or metal. The lateral sectional shape of each of the middle case 110 and the cap cases 120 may be a polygon, as shown in FIGS. 5 and 6. The polygon may be a rectangle, a square, a trapezoid, a parallelogram, a pentagon, or a hexagon, and corners of the polygon may be round. Alternatively, the lateral sectional shape of each of the middle case and the cap cases may be a circle, as shown in FIGS. 7 and 8. The circle may be an oval. FIGS. 5 to 8 show exemplary shapes of the membrane humidifier. However, the present disclosure is not limited thereto.

The middle case 110 is provided with a second fluid inlet 111, through which a second fluid is introduced, and a second fluid outlet 112, through which the second fluid is discharged. A hollow fiber membrane module F, in which a plurality of hollow fiber membranes are housed, is disposed in the middle case 110. Depending on design, reference numeral 111 may indicate the second fluid outlet, through which the second fluid is discharged, and reference numeral 112 may indicate the second fluid inlet, through which the second fluid is introduced. That is, one of reference numeral 111 and reference numeral 112 may indicate the second fluid inlet, and the other may indicate the second fluid outlet. In the following description, reference numeral 111 indicates the second fluid inlet, and reference numeral 112 indicates the second fluid outlet. However, the present disclosure is not limited thereto.

The hollow fiber membrane module F may include a hollow fiber membrane bundle constituted by a plurality of integrated hollow fiber membranes, as shown in FIGS. 6 and 8, or may include hollow fiber membrane cartridges C, in each of which hollow fiber membranes or hollow fiber membrane bundles are housed, as shown in FIGS. 5 and 7. FIGS. 5 and 7 exemplarily show that the hollow fiber membrane module F is constituted by a plurality of hollow fiber membrane cartridges C. However, the present disclosure is not limited thereto. The hollow fiber membrane module F may be constituted by a single hollow fiber membrane cartridge. Hereinafter, the present disclosure will be described by way of example based on the membrane humidifier of FIG. 5, configured such that the hollow fiber membrane module F is constituted by a plurality of hollow fiber membrane cartridges C and such that the lateral sectional shape of the membrane humidifier is a polygon; however, technical features of the present disclosure are substantially equally applicable to the membrane humidifiers of FIGS. 6 to 8. In addition, cartridges C, each of which has a circular or rectangular sectional shape, are exemplarily shown; however, the shape of each of the cartridges C is not limited thereto.

Figure 1:
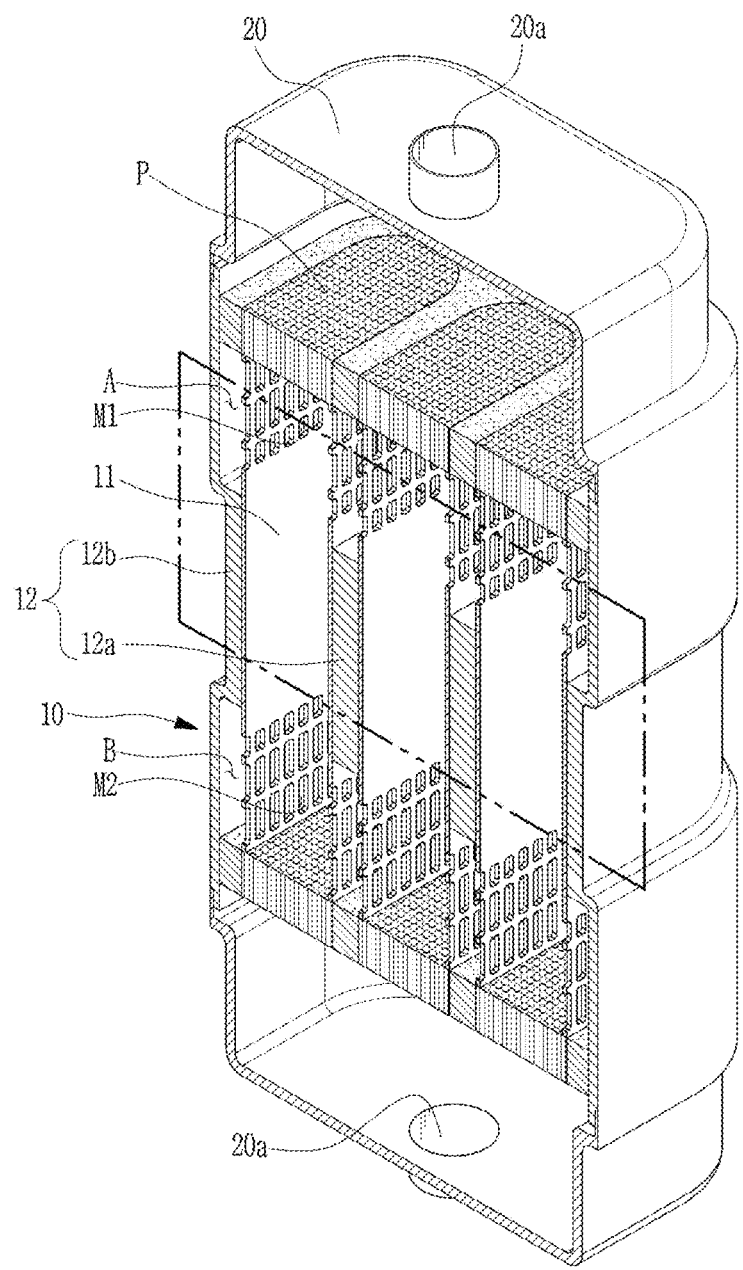
FIGS. 1 to 4 are views illustrating problems with a conventional fuel cell membrane humidifier.
Figure 2:
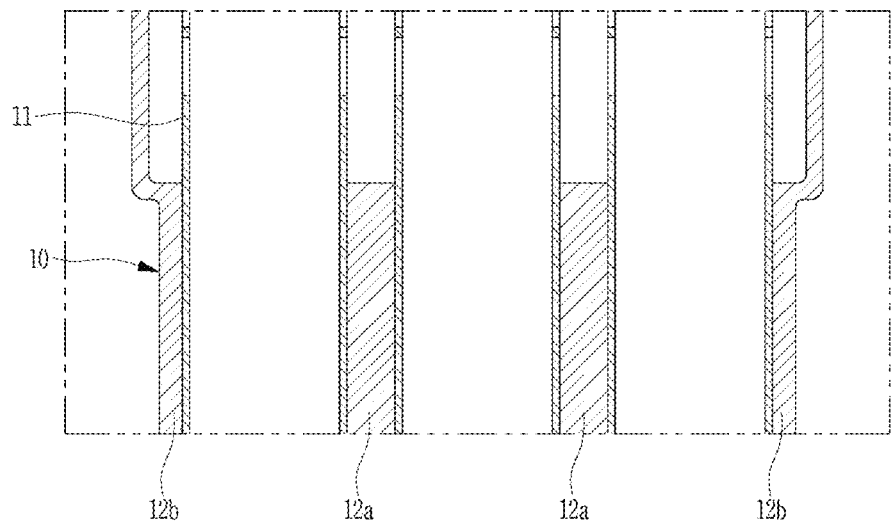
Figure 3:
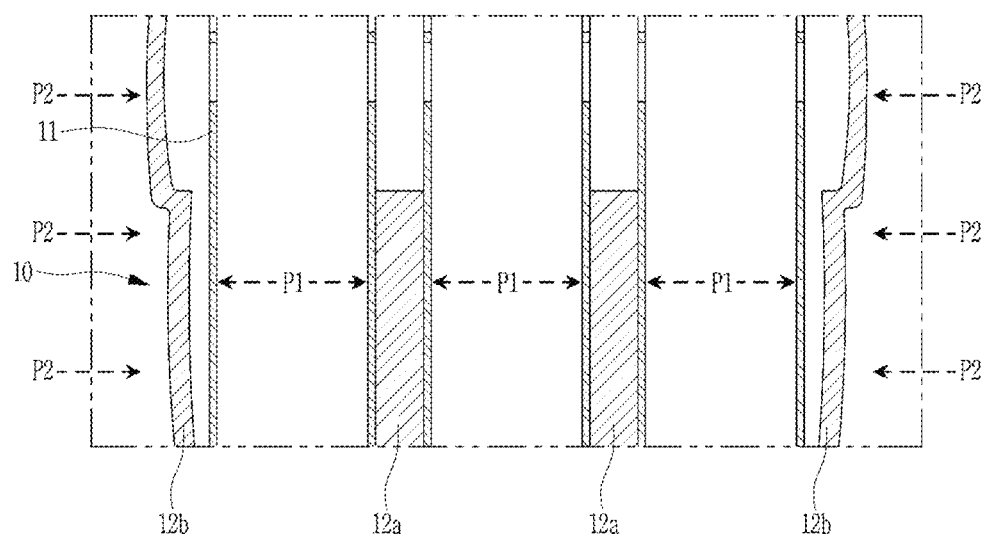
Figure 4:
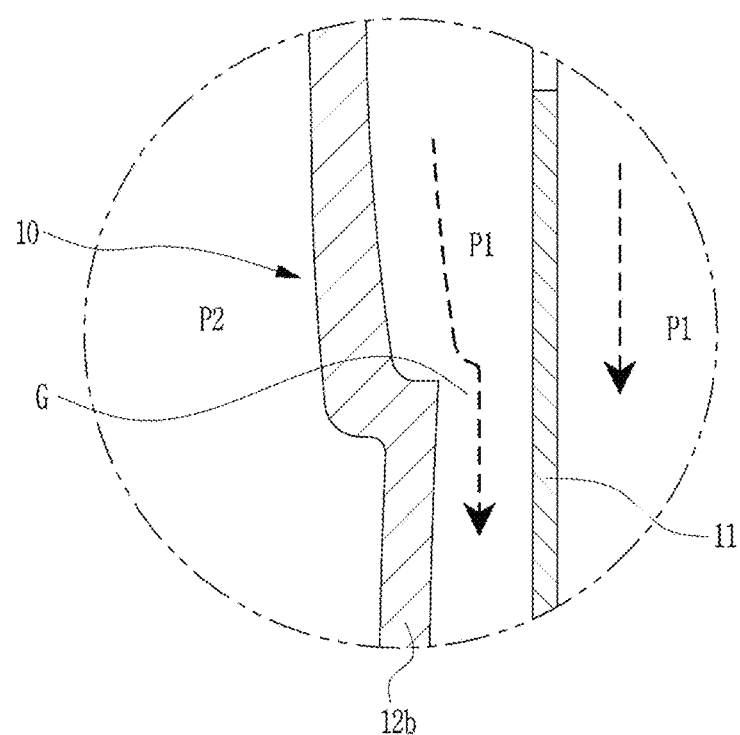

The cap cases 120 are coupled to opposite ends of the middle case 110. The cap cases 120 are provided with fluid introduction and discharge ports 121, one of which is a first fluid inlet and the other of which is a first fluid outlet. A first fluid introduced through the fluid introduction and discharge port 121 of one of the cap cases 120 flows through a hollow portion of each of the hollow fiber membranes housed in each of the hollow fiber membrane cartridges C (see FIG. 1) and is then discharged outside through the fluid introduction and discharge port 121 of the other cap case 120. Each of the hollow fiber membranes may be a hollow fiber membrane made of, for example, Nafion, polyetherimide, polyphenylsulfone, polyimide (PI), polysulfone (PS), or polyethersulfone (PES).

Each of the hollow fiber membrane cartridges C may be provided at one end thereof with a first mesh unit M1 (see FIG. 1) configured to allow the second fluid introduced into the membrane humidifier through the second fluid inlet 111 to be introduced into the hollow fiber membrane cartridge C therethrough, and may be provided at the other end thereof with a second mesh unit M2 (see FIG. 1) configured to allow the second fluid that has undergone moisture exchange in the hollow fiber membrane cartridge C to be discharged from the hollow fiber membrane cartridge C therethrough. Each of the hollow fiber membrane cartridges C is inserted into a module insertion unit 210 such that opposite side surfaces of the hollow fiber membrane cartridge are interposed between neighboring partition walls 211 and 212 (see FIG. 9). In addition, optionally, catching protrusions (not shown) may be formed at the opposite side surfaces of each of the hollow fiber membrane cartridges C, and when each of the hollow fiber membrane cartridges C is inserted into the module insertion unit 210, the catching protrusions may be caught by the partition walls 211 and 212 constituting the module insertion unit 210.

Each of the hollow fiber membrane cartridges C or the hollow fiber membrane bundles is provided at opposite ends thereof with potting units P configured to bind the hollow fiber membranes and to fill gaps between the hollow fiber membranes. As a result, the opposite ends of the hollow fiber membrane module F are blocked by the potting units P, whereby a flow channel configured to allow the second fluid to pass therethrough is defined in the hollow fiber membrane module. The potting units P not only may fill the gaps between the hollow fiber membranes but also may fix the hollow fiber membrane module F to the middle case 110. Each of the potting units P is made of a known material, and therefore a detailed description thereof will be omitted from this specification.

Figure 9:
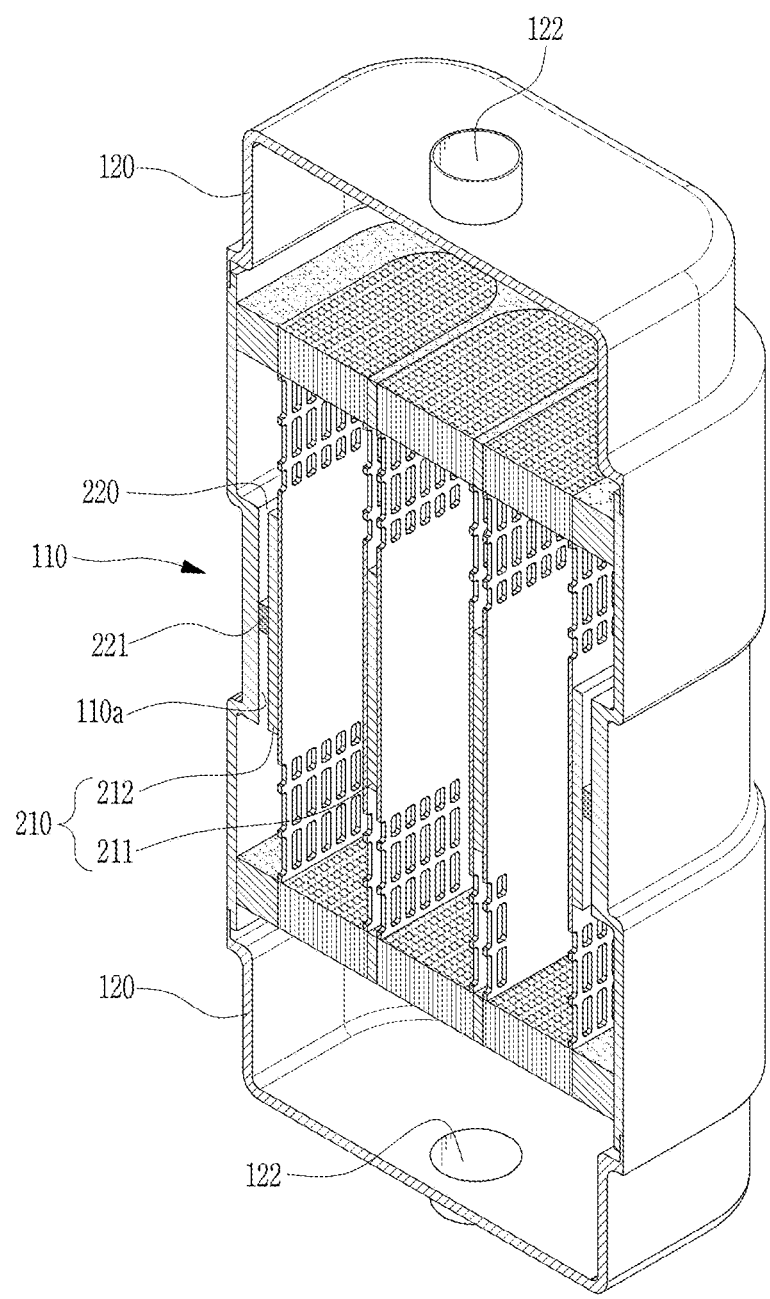
FIG. 9 is a sectional view showing a portion of a middle case of a fuel cell membrane humidifier according to an embodiment of the present disclosure.

FIG. 9 is a sectional view showing a portion of a middle case 110 of a fuel cell membrane humidifier according to an embodiment of the present disclosure. As shown in FIG. 9, a module insertion unit 210 and a pressure buffer unit 220 are formed in the middle case 110.

A hollow fiber membrane cartridge C, in which a plurality of hollow fiber membranes are housed, is inserted into the module insertion unit 210. The module insertion unit 210 may include a plurality of partition walls 211 and 212 configured such that each of a plurality of hollow fiber membrane cartridges C can be inserted into the module insertion unit therebetween.

An inner wall 110*a* of the middle case is spaced apart from the partition wall 212, which constitutes the outermost wall of the module insertion unit 210. A space S between the outermost partition wall 212 and the inner wall 110*a* of the middle case forms a pressure buffer unit 220. The pressure buffer unit 220 may further include a connection portion 221 disposed between the outermost partition wall 212 and the inner wall 110*a* of the middle case. The connection portion 221 may be formed along the circumference of the outermost partition wall 212. The connection portion 221 divides the space S into first and second spaces, which are isolated from each other, to isolate a fluid flow space A and a fluid flow space B from each other such that a fluid introduced into one of the fluid flow spaces through a corresponding one of the fluid introduction and discharge ports 121 flows to the other fluid flow space only through the hollow fiber membrane cartridges C.

Meanwhile, in the case in which the hollow fiber membrane module F is constituted by a single hollow fiber membrane cartridge C, the inner partition wall 211 may be omitted. In this case, the module insertion unit 210 may include only the outermost partition wall 212.

The pressure buffer unit 220 constructed as described above allows pressures at opposite sides of the outermost partition wall 212 to be substantially equal to each other. Since no pressure gradient is formed at opposite sides of the outermost partition wall 212 due to the pressure buffer unit 220, the outermost partition wall 212 is not deformed.

Figure 10:
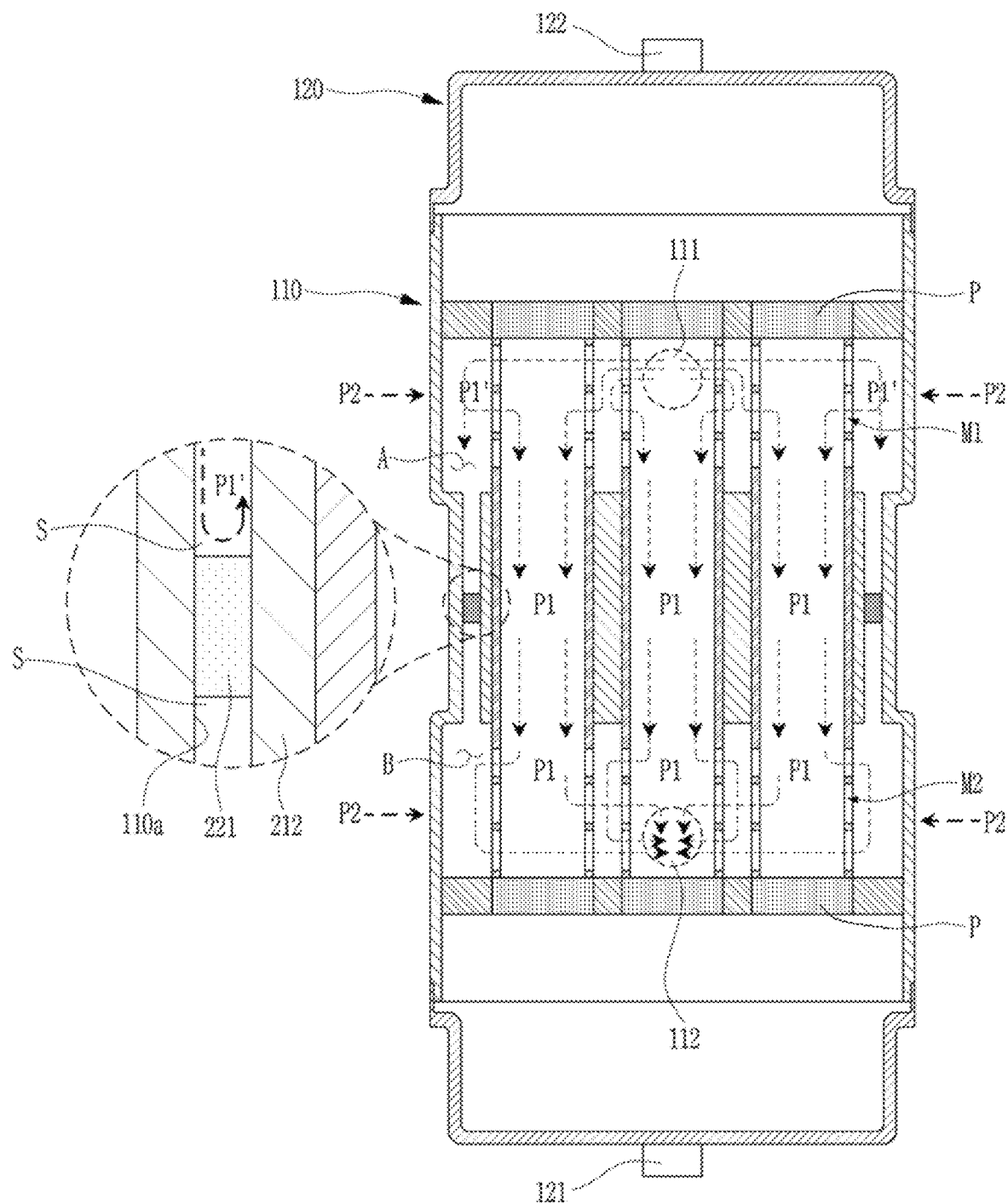
FIG. 10 is a sectional view showing the state in which a hollow fiber membrane module is disposed in the middle case of the fuel cell membrane humidifier according to the embodiment of the present disclosure.

In connection therewith, referring to FIG. 10, each hollow fiber membrane cartridge C is disposed between the between neighboring partition walls 211 and 211, a second fluid, discharged from a fuel cell stack (not shown) and introduced into second fluid inlet 111, is introduced into the cartridge C through the first mesh unit M1, flows outside the hollow fiber membranes, at which time moisture exchange occurs, and is discharged out of the cartridge through the second mesh unit M2. At this time, the pressure P1 of the fluid flowing through the hollow fiber membrane cartridge C is uniform, whereby pressures at opposite sides of the inner partition wall 211 are balanced, and therefore the inner partition wall 211 is not deformed.

Meanwhile, a second fluid having high pressure P1 flows through the hollow fiber membrane cartridge C at one side of the outermost partition wall 212, and a second fluid having high pressure P1' that does not flow through the hollow fiber membrane cartridge C flows at the other side of the outermost partition wall. Since the pressures of the second fluid flowing at opposite sides of the outermost partition wall 212 are substantially equal to each other (P1=P1'), pressures at opposite sides of the outermost partition wall 212 are balanced, and therefore the outermost partition wall 212 is not deformed. A pressure gradient may be formed due to the difference between the pressure P1' of the second fluid flowing in the pressure buffer unit 220 and atmospheric pressure P2 outside the middle case 110, whereby the inner wall 110*a* of the middle case may be deformed in an outward direction. However, such deformation has no substantial influence on the outermost partition wall 212, and the connection portion 221 inhibits this deformation (i.e. the fluid flow spaces A and B are still isolated from each other by the connection portion 221), whereby the flow of the second fluid through the pressure buffer unit 220 may be prevented. Airtightness between the outermost partition wall 212 and the hollow fiber membrane cartridge C is maintained, and therefore the second fluid is prevented from being discharged between the outermost partition wall 212 and the hollow fiber membrane cartridge C. Meanwhile, the second fluid introduced into the pressure buffer unit 220 turns at the connection portion 211, and then flows in the hollow fiber membrane cartridge C.

Unlike the conventional art, therefore, no gap is formed between the fiber membrane cartridge C and the outermost partition wall 212, and therefore it is possible to prevent the fluid in the fluid flow space A from flowing to the fluid flow space B not via the hollow fiber membrane module F. As a result, it is possible to prevent a decrease in humidification efficiency.

Figure 11:
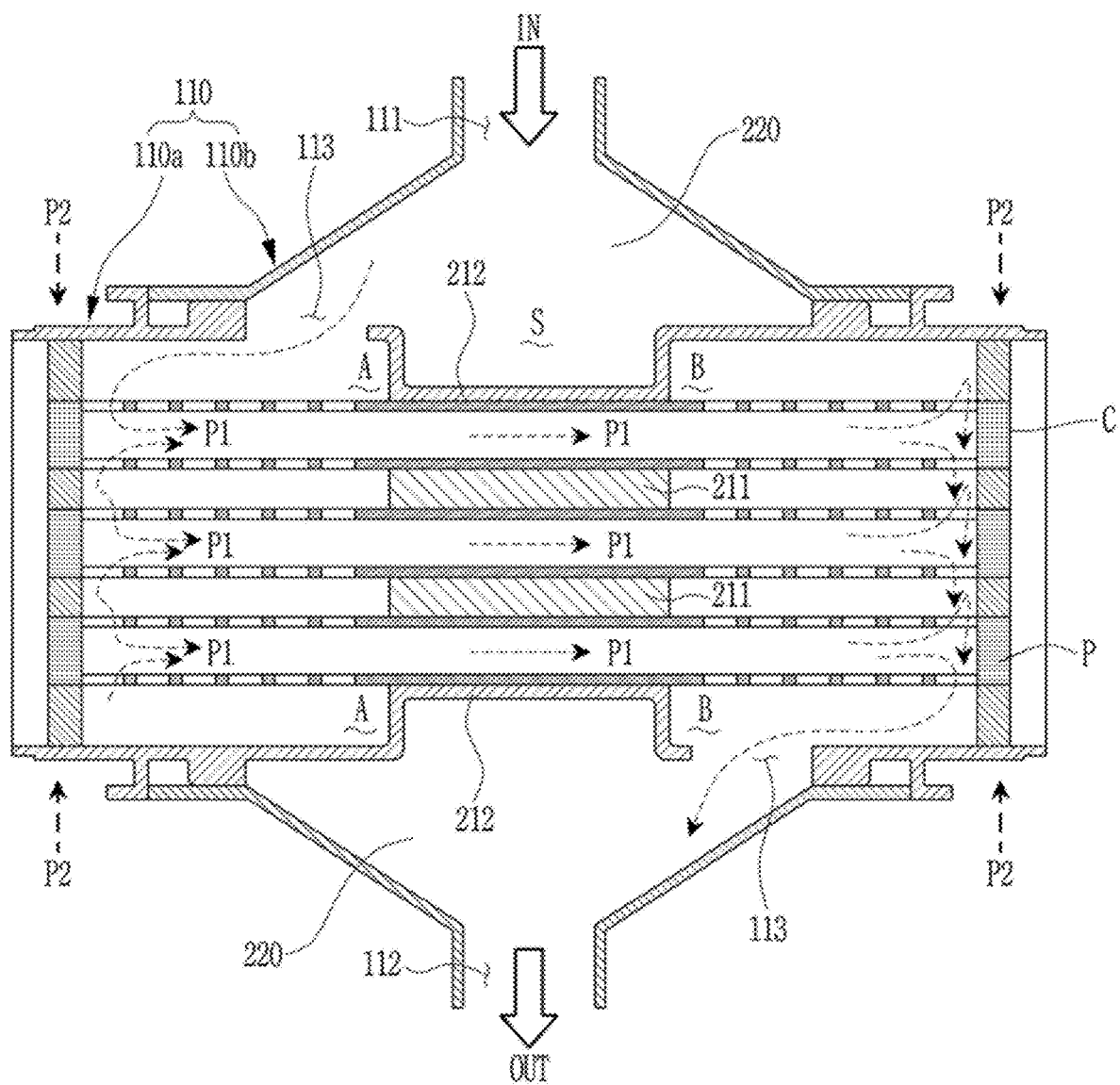
FIGS. 11 and 12 are sectional views showing a fuel cell membrane humidifier according to another embodiment of the present disclosure.
Figure 12:
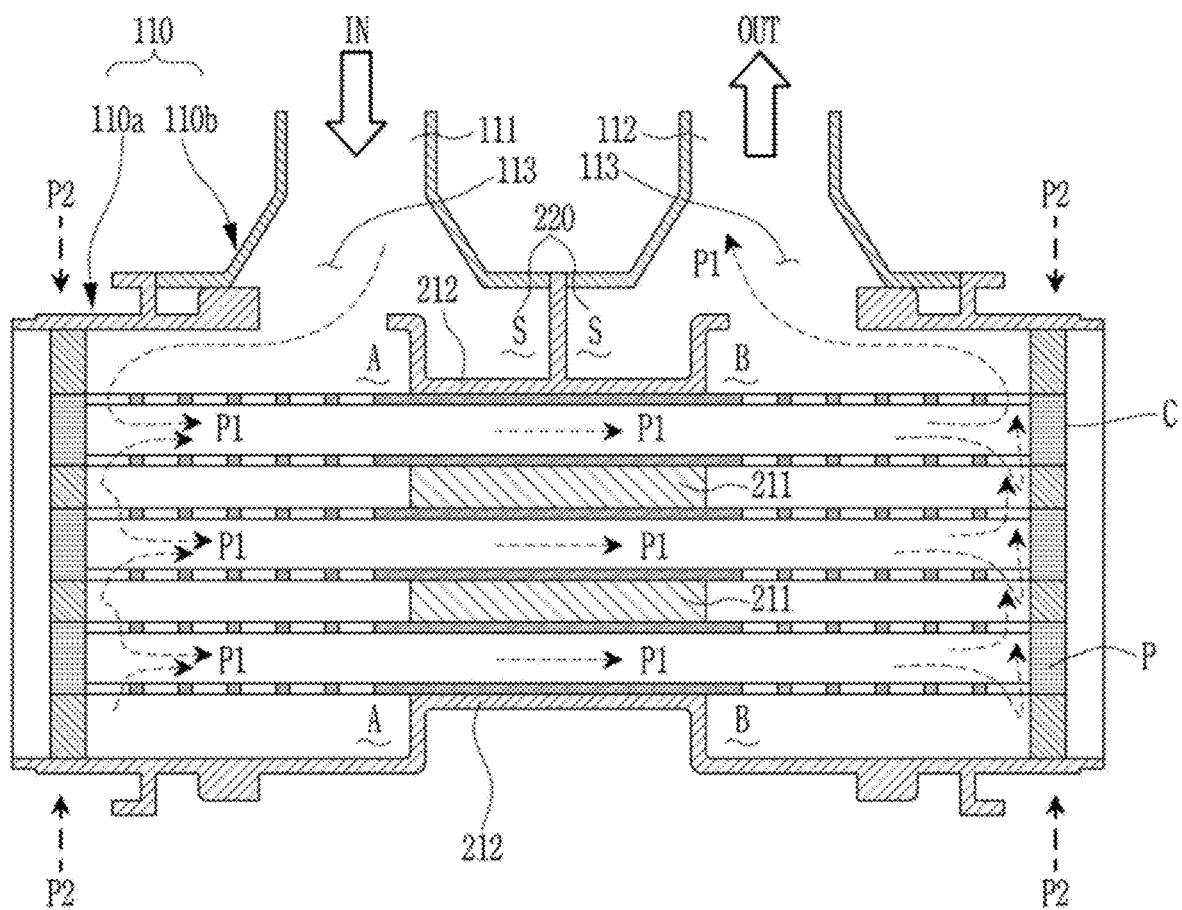

Hereinafter, a fuel cell membrane humidifier according to another embodiment of the present disclosure will be described with reference to FIGS. 11 and 12. FIGS. 11 and 12 are sectional views showing a fuel cell membrane humidifier according to another embodiment of the present disclosure.

In the fuel cell membrane humidifier according to this embodiment, a middle case 110 includes a middle case body 110*a* and a middle case cover 110*b*. In the previous embodiment described above, the second fluid inlet 111, through which the second fluid is introduced, and the second fluid outlet 112, through which the second fluid is discharged, are formed at opposite ends of the middle case 110. In contrast, in this embodiment, the middle case 110 includes a pair of middle case covers 110*b*, in which a second fluid inlet 111 and a second fluid outlet 112 are formed, wherein the middle case covers 110*b* are detachably coupled to the middle case body 110*a*. The middle case body 110*a* and the middle case covers 110*b* are provided with a fastening structure in which the middle case body and the middle case covers are detachably coupled to each other by assembly. For example, an insertion recess (not shown) may be formed in the middle case body 110*a*, and an insertion protrusion (not shown) may be formed on each of the middle case covers 110*b*, whereby the middle case body and the middle case covers are detachably coupled to each other through interference fitting. Alternatively, the middle case body and the middle case covers are detachably coupled to each other through screw engagement.

A hollow fiber membrane module including at least one hollow fiber membrane bundle or at least one hollow fiber membrane cartridge constituted by a plurality of hollow fiber membranes is disposed in the middle case body 110*a*, and at least one fluid window 113 configured to allow the second fluid, introduced through the second fluid inlet 111 formed in one of the middle case covers 110*b*, to flow in the middle case body 110*a* and to allow the second fluid, introduced through the second fluid outlet 112 formed in the other middle case cover 110b, to flow in the middle case body 110a is formed in at least one side surface of the middle case body 110a.

A fluid window 113 may be formed at each of one side and the other side of the middle case body 110a, as shown in FIG. 11, or a plurality of fluid windows 113 may be formed at one side of the middle case body 110a, as shown in FIG. 12.

Each of the middle case covers 110b includes a second fluid inlet 111 or a second fluid outlet 112. In the figure, the second fluid inlet 111 or the second fluid outlet 112 is shown as being formed in the center of each of the middle case cover 110b. However, the position of the second fluid inlet 111 or the second fluid outlet 112 may be changed depending on design. That is, the position of the second fluid inlet 111 or the second fluid outlet 112 may be changed depending on design environments, such as installation positions and installation spaces of the fuel cell and the fuel cell membrane humidifier. At this time, the second fluid inlet 111 and the second fluid outlet 112 may be located at opposite sides of the middle case body 110a, as shown in FIG. 11, or the second fluid inlet 111 and the second fluid outlet 112 may be located at only one side of the middle case body 110a, as shown in FIG. 12.

In this embodiment, a plurality of inner partition walls 211 are formed in the middle case body 110a, and a portion of the outer appearance of the middle case body 110a performs the function of the outermost partition wall 212. Hollow fiber membrane cartridges C are inserted between one inner partition wall 211 and another inner partition wall 211 and between one inner partition wall 211 and the outermost partition wall 212. The inner partition wall 211 and the outermost partition wall 212 define a module insertion unit 210, and the space S between the middle case body 110a and each of the middle case covers 110b (more specifically, the space between the outermost partition wall 212 and each of the middle case covers 110b) performs the function of a pressure buffer unit 220.

Meanwhile, in the case in which the hollow fiber membrane module F is constituted by a single hollow fiber membrane cartridge, the inner partition wall 211 may be omitted. In this case, the module insertion unit 210 may include only the outermost partition wall 212.

The pressure buffer unit 220 allows pressures at opposite sides of the outermost partition wall 212 to be substantially equal to each other. Since no pressure gradient is formed at opposite sides of the outermost partition wall 212 due to the pressure buffer unit 220, the outermost partition wall 212 is not deformed.

In connection therewith, referring to FIGS. 11 and 12, a second fluid, discharged from a fuel cell stack (not shown) and introduced into the second fluid inlet 111, is introduced into the cartridge C, flows outside the hollow fiber membranes, at which time moisture exchange is performed, and is discharged out of the cartridge. At this time, the pressure P1 of the fluid flowing through the hollow fiber membrane cartridge C is uniform, whereby pressures at opposite sides of the inner partition wall 211 are balanced, and therefore the inner partition wall 211 is not deformed.

A second fluid having high pressure P1 flows through the hollow fiber membrane cartridge C at one side of the outermost partition wall 212, and a second fluid introduced into the second fluid inlet 111 flows at the other side of the outermost partition wall (the space S). Since the fluids are the same, pressures at opposite sides of the outermost partition wall 212 are balanced, and therefore the outermost partition wall 212 is not deformed.

Meanwhile, a high-pressure fluid flows in the space S constituting the pressure buffer unit 220, and there is atmospheric pressure P2 outside each middle case cover 110b. As a result, a pressure gradient is formed due to the difference therebetween, whereby the middle case cover 110b is deformed in an outward direction. However, such deformation has no substantial influence on the outermost partition wall 212, which is a portion of the external appearance of the middle case body 110a. Consequently, airtightness between the outermost partition wall 212 and the hollow fiber membrane cartridge C is maintained, and therefore the second fluid is prevented from being discharged between the outermost partition wall 212 and the hollow fiber membrane cartridge C. That is, the second fluid introduced into the second fluid inlet 111 does not flow from the fluid flow space A to the fluid flow space B. As a result, it is possible to prevent a decrease in humidification efficiency.

Although embodiments of the present disclosure have been described above, it will be apparent to a person having ordinary skill in the art to which the present disclosure pertains that the present disclosure can be variously modified and altered through addition, change, deletion, or supplement of components without departing from the idea of the present disclosure recited in the following claims and that such modifications and alterations fall within the scope of right of the present disclosure.

The invention claimed is:

1. A fuel cell membrane humidifier comprising:
a middle case having a module insertion unit therein, the module insertion unit comprising an outermost partition wall and first and second inner partition walls, the outermost partition wall being spaced apart from an inner wall of the middle case, the first inner partition wall being between the outermost partition wall and the second inner partition wall;
a cap case coupled to the middle case;
first and second hollow fiber membrane modules inserted in the module insertion unit; a pressure buffer unit between the inner wall of the middle case and the outermost partition wall; and
a connection portion disposed between the inner wall of the middle case and the outermost partition wall in such a way that the pressure buffer unit is divided into first and second spaces isolated from each other by the connection portion,
wherein the first hollow fiber membrane module comprises:
a first cartridge having first openings at opposite ends thereof, the first cartridge being interposed between and in contact with the outermost partition wall and the first inner partition wall;
a plurality of first hollow fiber membranes housed in the first cartridge; and
first potting units provided at the opposite ends of the first cartridge, the first potting units filling gaps between the first hollow fiber membranes to bind the first hollow fiber membranes and block the first openings of the first cartridge, and
wherein the second hollow fiber membrane module comprises:
a second cartridge having second openings at opposite ends thereof, the second cartridge being interposed between and in contact with the first and second inner partition walls;

a plurality of second hollow fiber membranes housed in the second cartridge; and second potting units provided at the opposite ends of the second cartridge, the second potting units filling gaps between the second hollow fiber membranes to bind the second hollow fiber membranes and block the second openings of the second cartridge.

\* \* \* \* \*